(12) United States Patent
Kuroda et al.

(10) Patent No.: US 7,444,892 B2
(45) Date of Patent: Nov. 4, 2008

(54) CONTINUOUSLY VARIABLE TRANSMISSION BELT INSPECTION METHOD AND INSPECTION DEVICE THEREOF

(75) Inventors: Hiroaki Kuroda, Mishima (JP); Eiichiro Muramatsu, Fuji (JP); Kazuhiro Mizumiya, Kawasaki (JP); Makoto Momoi, Ayase (JP); Tomoo Kawagoshi, Machida (JP); Masanori Taguchi, Takasaki (JP)

(73) Assignee: Jatco Ltd. (JP)

( * ) Notice: Subject to any disclaimer, the term of this patent is extended or adjusted under 35 U.S.C. 154(b) by 254 days.

(21) Appl. No.: 11/193,395

(22) Filed: Aug. 1, 2005

(65) Prior Publication Data
US 2006/0037415 A1    Feb. 23, 2006

(30) Foreign Application Priority Data
Aug. 5, 2004    (JP) ............................... 2004-229760

(51) Int. Cl.
*G01N 19/00* (2006.01)

(52) U.S. Cl. ........................................... 73/865.9
(58) Field of Classification Search .................. None
See application file for complete search history.

(56) References Cited

U.S. PATENT DOCUMENTS

2003/0233895 A1* 12/2003 Shori et al. ................. 73/865.9

FOREIGN PATENT DOCUMENTS

JP    2001-021007    1/2001

* cited by examiner

*Primary Examiner*—Robert R Raevis
(74) *Attorney, Agent, or Firm*—Blank Rome LLP

(57) ABSTRACT

A Continuously Variable Transmission (CVT) belt inspection device comprising a detection section for a running track and a determination section for distinguishing at least whether the cause of that running track is a substance attributable to an impurity, such as metal powder, etc. or an object attributable to an irregular-shaped area based on the periodicity of that running track. Particularly, when the cause of a running track is determined to be a substance attributable to an innocuous impurity, such as metal powder, etc., unnecessary part replacements can be avoided and a significant cost reduction achieved.

8 Claims, 8 Drawing Sheets

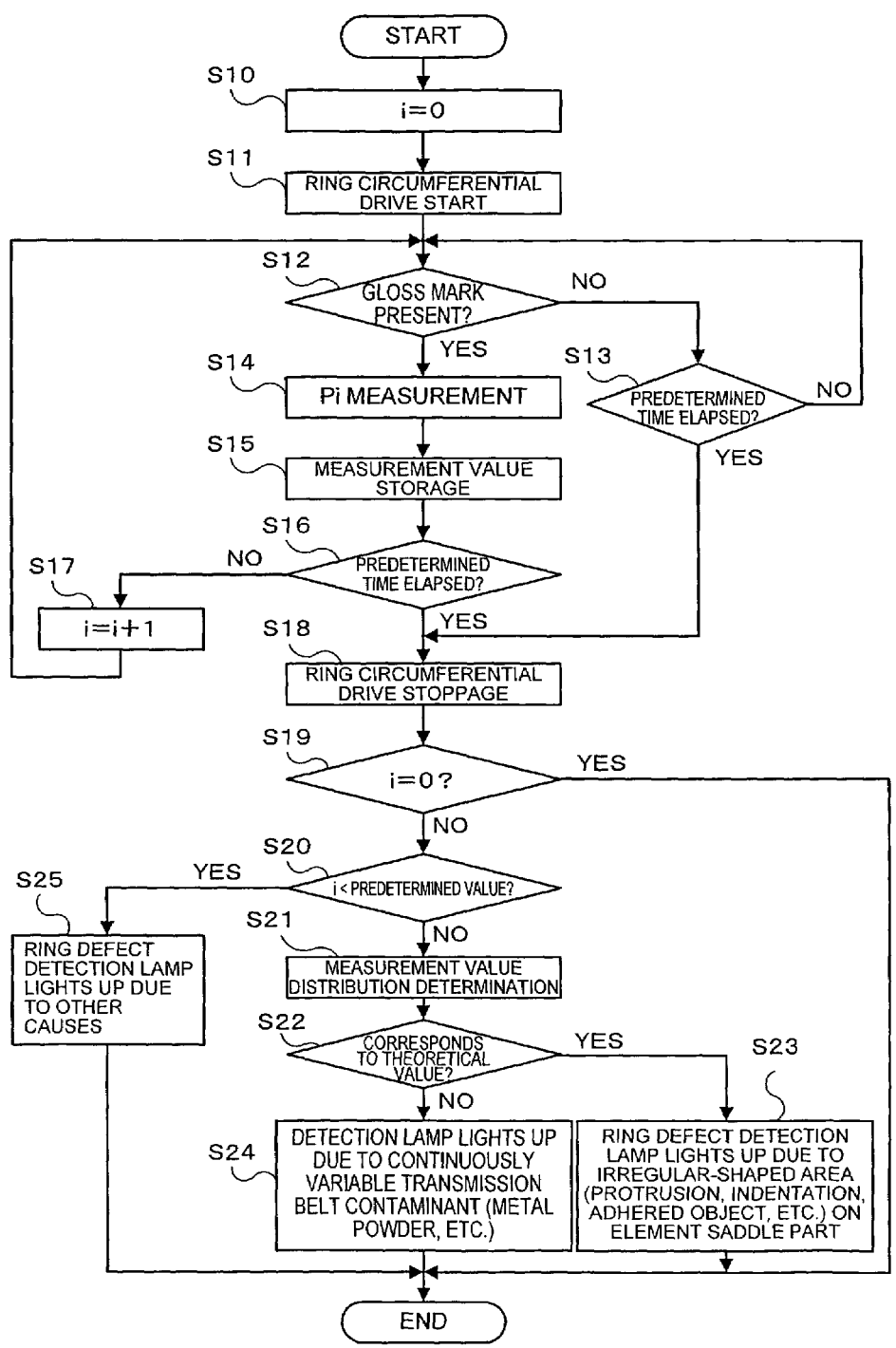

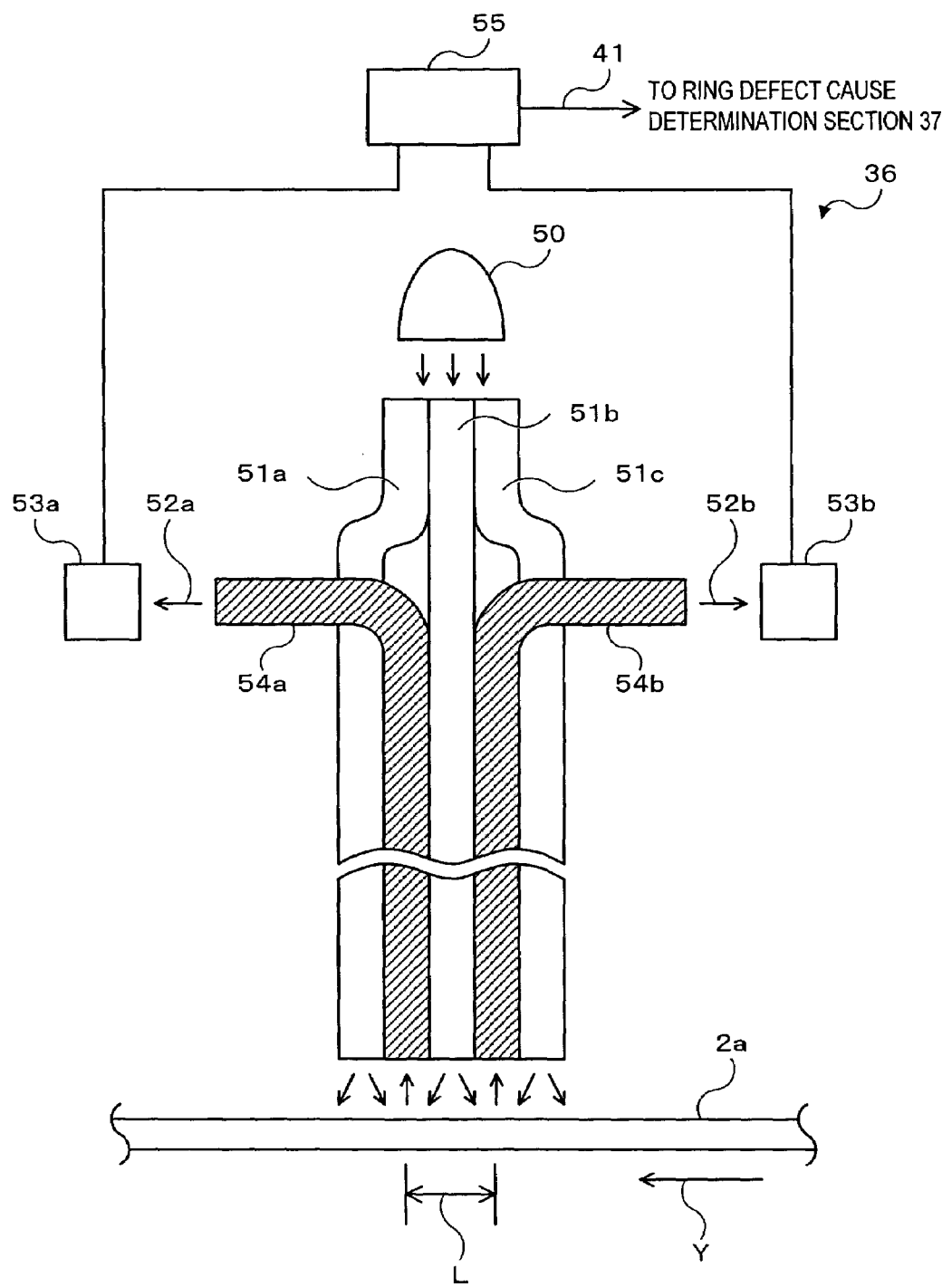

PRIOR ART

CONTINUOUSLY VARIABLE TRANSMISSION BELT INSPECTION METHOD AND INSPECTION DEVICE THEREOF

BACKGROUND OF THE INVENTION

1. Field of the Invention

The present invention relates to a Continuously Variable Transmission (CVT) belt inspection method and associated CVT belt inspection device. More particularly, the present invention relates to a CVT belt inspection method and CVT belt inspection device designed for a large number of stacked layer metal elements punched and processed into a specified shape which are assembled to support two laminated bands of a metal stepless belt (hereinafter denoted as "metal belt").

2. Description of the Related Art

FIGS. 7A~7B are outline views of a CVT belt disclosed in Japanese Laid-Open (Kokai) Patent Application No. 2001-21007 titled "BELT FOR CONTINUOUSLY VARIABLE TRANSMISSION", etc. In this diagram, a CVT belt 1 is constructed by assembling two laminated belts 2 containing a plurality of metal belts 2a (for example, a stack of about 12 endless layers) which are supported by thin trapezoidal layered elements 3 composed of a large number of metal elements 3a (for example, about 400 consecutive elements).

Each of the metal elements 3a consists of a steel block (small piece of metal) punched and processed from a metal plate and molded into a specified shape, for example, the physical form resembling the upper-half image of a human body. Specifically, a metal element 3a resembles a molded shape having a head portion 3b and a chest portion 3c, along with a neck portion 3d which connects between the head portion 3b and the chest portion 3c.

The head portion 3b has a protrusion 3e (raised circular knurl) (front surface as seen in FIG. 7B) formed in one direction of the surface side and a cavity (circular indent) (rear surface not shown) formed in the same location on the opposite direction surface side. Alignment of the metal elements 3a is accomplished by consecutively inserting the protrusion 3e into the cavity of adjoining metal elements 3a.

Two laminated belts 2 are inserted into the recessed parts 3f (belt grooves) formed between the head portion 3b and the chest portion 3c of the metal elements 3a, respectively. Here, when the gap (the space clearance width of the recessed parts 3f) between the head portion 3b and the chest portion 3c is defined as "L" (refer to FIG. 7B), the number of stacked layers for the laminated belts 2 is set so that the lamination thickness "D" for each of the laminated belts 2 (refer to FIG. 7A) becomes substantially "L" of an equivalent or slightly smaller value.

Apart from that, the CVT belt 1 is an essential torque transmission element for conveying driving force to a drive system in a vehicle, such as an automobile, etc. Especially, since sufficiently high tensile force is applied to the CVT belt 1 in a vehicle with a high-powered engine installed, the durability of the CVT belt 1 must be carefully considered.

Accordingly, the above-mentioned Japanese Patent Application No. 2001-21007 discloses the purpose as being effective by creating a shape for a particular part of the metal elements 3a in order to solve the above-mentioned limitation. This suggests the technological problem which has an adverse influence on the durability of the CVT belt 1 has been solved. Namely, this relates to the fatigue life of the metal belts 2a which becomes shortened due to friction and the combined push-pull action generated between the metal elements 3a and the metal belts 2a when applying torque transmission driving force.

Here, the "particular part" of the metal elements 3a is the part in contact with the metal belts 2a situated in the innermost circumference layer of the laminated belts 2. Specifically, the "particular part" of the metal elements 3a is both shoulder parts 3g of the chest portion 3c (hereinafter denoted as "element saddle part") which experience powerful tensile and compressive forces when transmission driving force is applied.

The technical matter disclosed in the above-mentioned conventional prior art is applied when performing the forming process of the metal elements 3a exclusively. Hypothetically speaking, even if an ideal processing shape can be designed, it is still a paper plan. Namely, when components (metal elements 3a) are initially manufactured occurrences of "irregular shaped areas" are undeniable. For example, "burrs", "collars", "protrusions", "swells" (bumps), etc. are common which are caused by punch processing deviation errors.

FIG. 8 is a diagram showing an irregular-shaped area example on a metal element 3a. In this drawing, a small protrusion 3h formed on the element saddle part 3g represents an irregular-shaped area. As also explained earlier, since this element saddle part 3g is the part pushed< >pulled by a strong force against the metal belts 2a situated in the innermost circumference layer of the laminated belts 2 when transmitting driving force, by the existence of this protrusion 3h, a flaw will be scarred on the surface of a metal belt 2a situated in the innermost circumference layer of the laminated belt 2. In addition, this flaw is observed as a glossy flaw, namely, a gloss mark. In this regard, the metal belt 2a surface constitutes a matted hardened coating (non-glossy lusterless finish) and the hardened coating is partly exfoliated by the protrusion 3h. As a result, the underlying base layer is exposed as being glossy. Also, an irregular-shaped area is not restricted to only the protrusion 3h in the diagram. Other abnormalities which can scrape away some of the metal belt 2a surface hardened layer such as an indentation, an adhered object, etc. are included.

The laminated belt 2 is only inserted in the recessed parts 3f of each of the metal elements 3a which constitute the layered elements 3. As both (the laminated belts 2 and the layered elements 3) have some relative displacement allowance in the circumferential direction of the ring when transmitting driving force, the above-mentioned flaw will be intermittent in the circumferential direction of a metal belt 2a and will cause a ring defect referred to as a "running track."

As the conventional CVT belt inspection method and CVT belt inspection device of a CVT belt, for example, a CVT belt 1 is attached for a predetermined time interval to an actual vehicle (or attached to a testing device of an actual vehicle). After a trial use that exerts actual driving force, the CVT belt 1 is disassembled. The surface of the metal belt 2a situated in the innermost circumference layer of a laminated belt 2 is observed, and the method for judging the presence of the above-mentioned "running track" (a gloss mark which is intermittent in the circumferential direction) is considered. In this case, when judged as containing a running track, the related faulty metal elements 3a and the metal belt 2a with a "running track" are excluded as a defective product and the CVT belt 1 reassembled.

Apart from that, the cause which generates a "running track" is not only an irregular-shaped area of the metal elements 3a. For example, also a substance impurity (synonymous with contaminant), such as metal powder, etc., which enters the inner part of the CVT belt 1 can generate the above-mentioned flaw similar to a "running track," namely, intermittent gloss marks.

Both types of flaws are common in regard to being intermittent gloss marks, and thus distinction of the cause is troublesome. For this reason, conventionally in cases where intermittent gloss marks are scarred on the metal belts 2a after trial use, the margin of safety is considered paramount. Thus, in those causes "deemed" irregular-shaped areas on the metal elements 3a, a total exchange of the metal elements 3a and replacement of the metal belts 2a is performed.

However, this is an excessive countermeasure and not preferred in terms of cost. A flaw attached by a substance impurity, such as metal powder, etc., creates simply a friction trace and the durability of a CVT belt 1 is not impaired.

Therefore, the present invention in relation to "running track" generation causes can at least patently distinguish between those generated due to a harmless substance impurity, such as metal powder, etc. as well those generated due a damaging irregular-shaped area. Particularly, the object of the present invention is to provide a CVT belt inspection method and a CVT belt inspection device which contribute significantly to cost reduction by not performing unnecessary part replacements in cases when distinguished as an innocuous impurity, such as metal powder, etc.

SUMMARY OF THE INVENTION

As a result of repeating a variety of experiments and verification, the inventors of the present invention have determined that a unique characteristic for each type of gloss mark defect generation cause can be derived from a "running track" periodicity. Based on these periodicity characteristics (rate of recurrence at regular intervals), a novel concept has been developed for distinguishing at least between a substance attributable to an innocuous impurity, such as metal power, etc. and an object attributable to a damaging irregular-shaped area. As a direct result of this experimentation, a CVT belt inspection method and CVT belt inspection device have been invented which have the following means.

Specifically, a Continuously Variable Transmission (CVT) belt inspection method related to the present invention comprises the steps of: a trial use process of a CVT belt which incorporates a testing device of an actual vehicle or actual vehicle equivalent; a disassembly process for the trial use CVT belt and detachment of a metal belt situated in an innermost circumference layer; a detection process for an intermittent flaw along a circumferential direction of the metal belt inner circumference surface; and a determination process for determining whether or not a repeating period of a flaw corresponds to a predetermined reference period when the intermittent flaw is detected, wherein a case of corresponding determines the cause of a flaw as being an object attributable to an irregular-shaped area formed on a metal element saddle part which constitutes the CVT belt, and wherein a case of not corresponding determines the cause of a flaw as being a substance attributable to an innocuous impurity which penetrated into the CVT belt.

Furthermore, a Continuously Variable Transmission (CVT) belt inspection device comprises a detection means for detecting an intermittent flaw along a circumferential direction of a metal belt inner circumference surface situated in an innermost circumference layer of a CVT belt, which incorporates trial use in a testing device of an actual vehicle or an actual vehicle equivalent; a determination means for determining whether or not a repeating period of a flaw corresponds to a predetermined reference period when the intermittent flaw is detected by the detection means, wherein a case of corresponding determines the cause of a flaw as being an object attributable to an irregular-shaped area formed on a metal element saddle part which constitutes the CVT belt, and wherein a case of not corresponding determines the cause of a flaw as being a substance attributable to an innocuous impurity which penetrated into the CVT belt; and a display means for displaying a determination result of the determination means.

In the preferred embodiment of the present invention, the predetermined reference period is established based on a transmission gear ratio in a testing device of an actual vehicle or actual vehicle equivalent when incorporating the CVT belt for trial use.

In the present invention, the CVT belt after a trial use installation in a testing device of an actual vehicle or actual vehicle equivalent is dismounted. Then, the existence of an intermittent flaw (running track) along the circumferential direction of the metal belt inner circumference surface and situated in the innermost circumference layer is inspected. When containing an intermittent flaw, the operation judges whether or not the flaw repeating period corresponds to a predetermined reference period. In cases of not actually corresponding, the cause of the flaw is judged as a substance attributable to an innocuous impurity which penetrated into the CVT belt. Conversely, in cases of actually corresponding, the cause of the flaw is judged as an object attributable to a damaging irregular-shaped area formed on the element saddle part of a metal element.

In this manner, the present invention is able to at least precisely distinguish whether or not the cause of the running track is a substance due to an impurity, such as metal powder, etc. or an object due to an irregular-shaped area based on the "running track" periodicity. On occasions where judged as a substance attributable to an innocuous impurity, such as metal powder, etc., unnecessary part replacements can be avoided and a significant cost reduction achieved.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 5 is a diagram showing an operation flow chart of a ring defect cause determination section 37;

FIG. 6 is another configuration diagram of a detection section 36;

FIG. 8 is a diagram showing an irregular-shaped area example on a metal element 3a.

DETAILED DESCRIPTION OF THE PREFERRED EMBODIMENTS

Hereinafter, the preferred embodiments of the present invention will be described in detail with reference to the drawings.

Additionally, illustration of specific or example numerical values for various details in the following explanation or character strings and other symbols are merely references for a clear understanding of the concept of the present invention. Accordingly, the concept of the present invention should not be limited explicitly to this terminology entirely or in part.

Furthermore, explanation has been omitted which describes details of well-known methods, well-known procedures, well-known architecture, well-known circuit configurations, etc. (hereinafter denoted as "common knowledge") for the purpose of a concise explanation, but does not intentionally exclude this common knowledge entirely or in part. Therefore, relevant common knowledge already known by persons skilled in the art at the time of filing the present invention is naturally included in the following description.

In order to identify the existence and generation cause of a Continuously Variable Belt (CVT) belt 1 "running track," initially, a CVT belt 1 is installed in a testing device of an actual vehicle or actual vehicle equivalent. A trial use (test drive run) is performed by exerting actual driving force in a predetermined transmission gear ratio (change gear ratio) and for a predetermined time interval.

Figure 1:
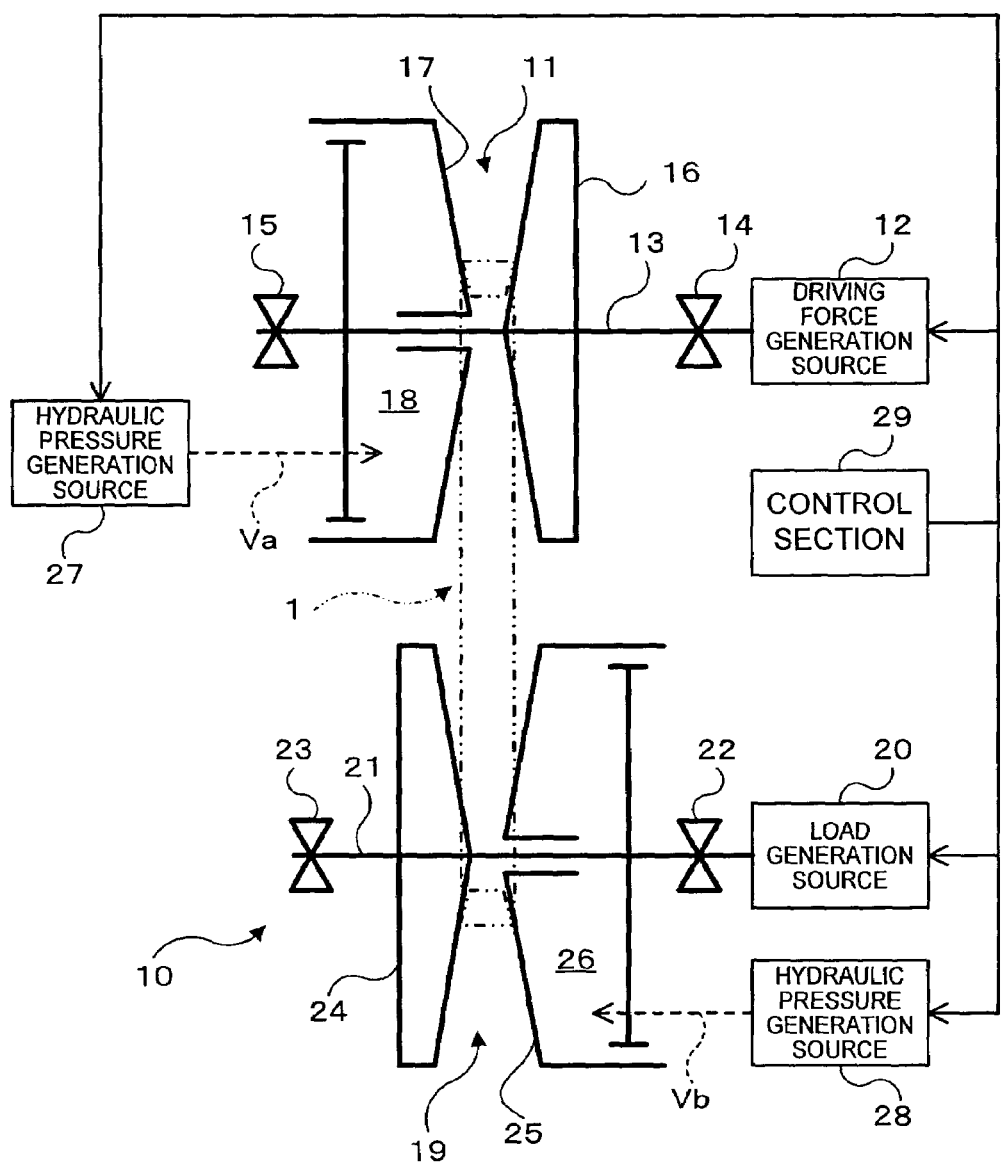
FIG. 1 is a diagram showing the outline structure of a testing device 10.

FIG. 1 is a diagram showing the outline structure of a testing device 10. As seen in FIG. 1, a drive pulley 11 comprises a drive shaft 13 coupled to the rotational axis of a driving force generation source 12 (for example, an electric motor); bearing 14, 15 retain both ends of the drive shaft 13 enabling free rotation; a fixed side pulley half-body 16 is secured to the drive shaft 13; and a movable side pulley half-body 17 is positioned on the drive shaft 13 in relation to the fixed side pulley half-body 16. The movable side pulley half-body 17 applies force toward the fixed side pulley half-body 16 responsive to the oil pressure Va interaction in an oil chamber 18. The movable side pulley half-body 17 is also referred to as a moveable sheave.

In addition, a driven pulley 19 comprises a drive shaft 21 positioned in parallel with the drive shaft 13 and coupled to the rotational axis of a load generation source 20 (for example, regenerative brake equipment using an electric motor); a bearing 22, 23 retain both ends of the drive shaft 21 enabling free rotation; a fixed side pulley half-body 24 is secured to the drive shaft 21; a movable side pulley half-body 25 is positioned on the drive shaft 21 in relation to the fixed side pulley half-body 24. The movable side pulley half-body 25 applies force toward the fixed side pulley half-body 24 responsive to the oil pressure Vb interaction in oil chamber 26. The movable side pulley half-body 25 is also referred to as a moveable sheave.

Furthermore, the testing device 10 comprises the hydraulic pressure generation sources 27, 28 for generating oil pressures Va, Vb; and comprises a control section 29 for controlling operation of a load generation source 20 and the hydraulic pressure generation sources 27, 28.

Based on the testing device 10 having such a configuration, initially, a CVT belt 1 is wrapped around the drive pulley 11 and the driven pulley 19. By controlling the respective oil pressures Va, Vb, tensile and compressive forces are applied to either or both sides of the movable side pulley half-body 17, 25 of the drive pulley 11 and the driven pulley 19 toward the fixed side pulley half-body 16, 24, as well as can be freely set to the desired effective radius of the drive pulley 11 and the driven pulley 19. For example, in the case of setting the curvature Ri for the portion wrapped around the drive pulley 11 and the curvature Ro for the portion wrapped around the driven pulley 19 of the CVT belt 1, the relationship between Ri and Ro, namely, the CVT change gear ratio, can be established without restrictions.

In this embodiment, after setting the preferred relationship (preferred change gear ratio) between the curvature Ri, Ro of the CVT belt 1, the load force of the load generation source 20 and the driving force of the driving force generation source 12 are each set as a predetermined value, accompanied by setting a predetermined time interval for the CVT belt 1 trial use.

At this stage, the CVT belt 1 remains wrapped around the drive pulley 11 and the driven pulley 19 and grasped between the V-shaped groove (wedge-like groove formed by the movable side pulley half-body 17, 25 and the fixed side pulley half-body 16, 24) of the drive pulley 11 and driven pulley 19. Then, compressing force is applied to the V-shaped grooves corresponding to the oil pressures Va, Vb which become sufficiently powerful.

Figure 7A:
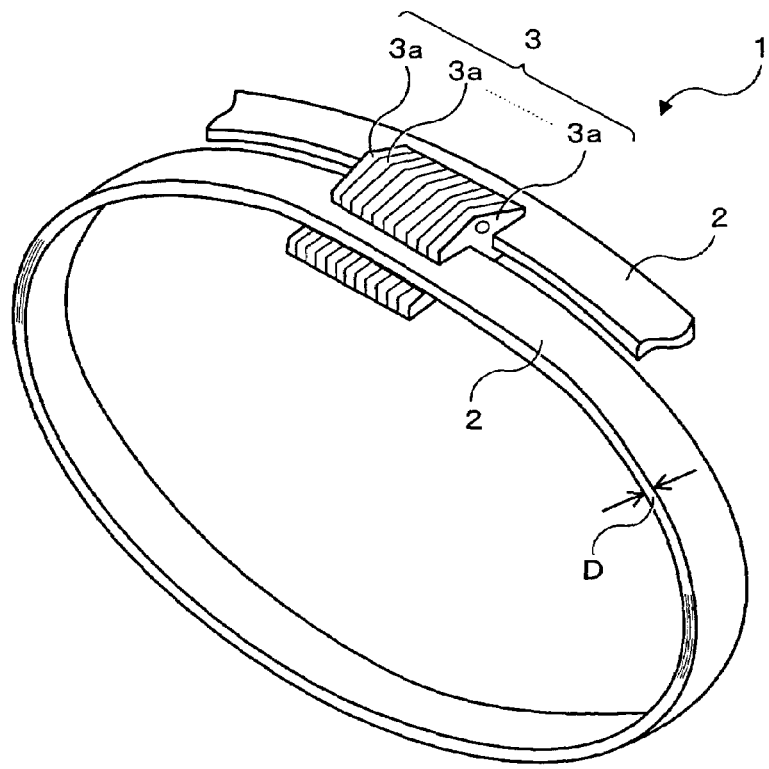
FIG. 7A~7B are outline views of a CVT belt in conventional prior art.
Figure 7B:
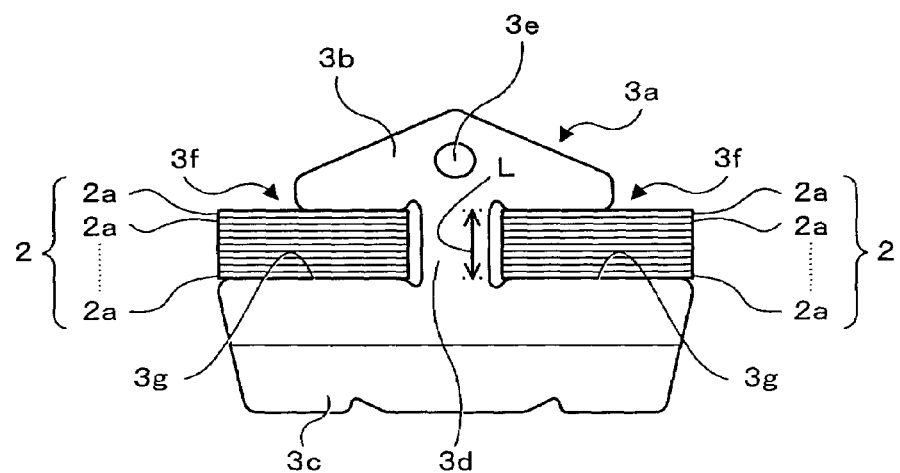
Figure 8:
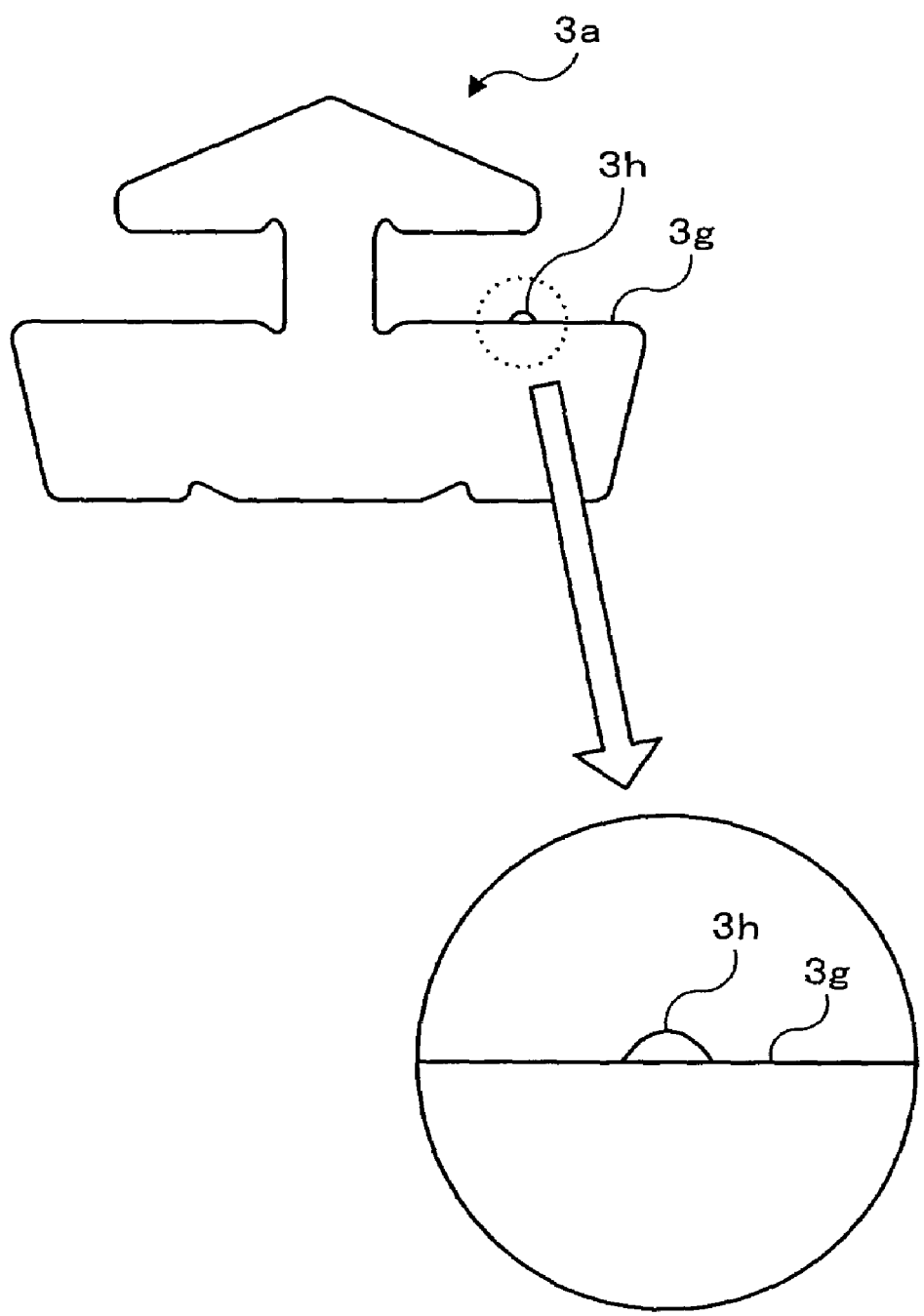

Meanwhile, in the CVT belt 1 as explained earlier (refer to FIG. 7), the layered elements 3 which constitute a large number of metal elements 3a are assembled to support two laminated belts 2 which constitute a plurality of metal belts 2a (laminated steel bands). The layered elements 3 are sandwiched in the above-mentioned V-shaped groove and two laminated belts 2 are inserted only in the recessed parts 3f of each of the metal elements 3a which constitute these layered elements 3.

Accordingly, with the CVT belt 1 wrapped around the drive pulley 11 and the driven pulley 19, the portion of the layered elements 3 sandwiched between the V-shaped groove of the drive pulley 11 precisely follows the rotation of the drive pulley 11 and performs circumferential movement. The two laminated belts 2 rotate at a traveling speed slightly slower than the circumferential traveling speed of the layered elements 3. Moreover, the portion of the layered elements 3 sandwiched between the V-shaped groove of the driven pulley 19 eventually become operational and rotate the driven pulley 19 in response to this circumferential movement.

The "difference" between the circumferential traveling speed of the layered elements 3 and the circumferential traveling speed of the two laminated belts 2 is primarily decided by the magnitude of the driving force and the load force coupled with the relationship between Ri and Ro (namely, the change gear ratio of a CVT). Besides, these "differences" are principal components in determining the below-mentioned "running track pitch." Hereinafter, the magnitude of the driving force and the load force are denoted as a predetermined value. In addition, when the terminology "running track pitch" also assumes the relationship between Ri and Ro (i.e., the change gear ratio of a CVT) in a predetermined value, this is denoted as the "theoretical value of the running track pitch" (or simply "theoretical value").

Figure 2:
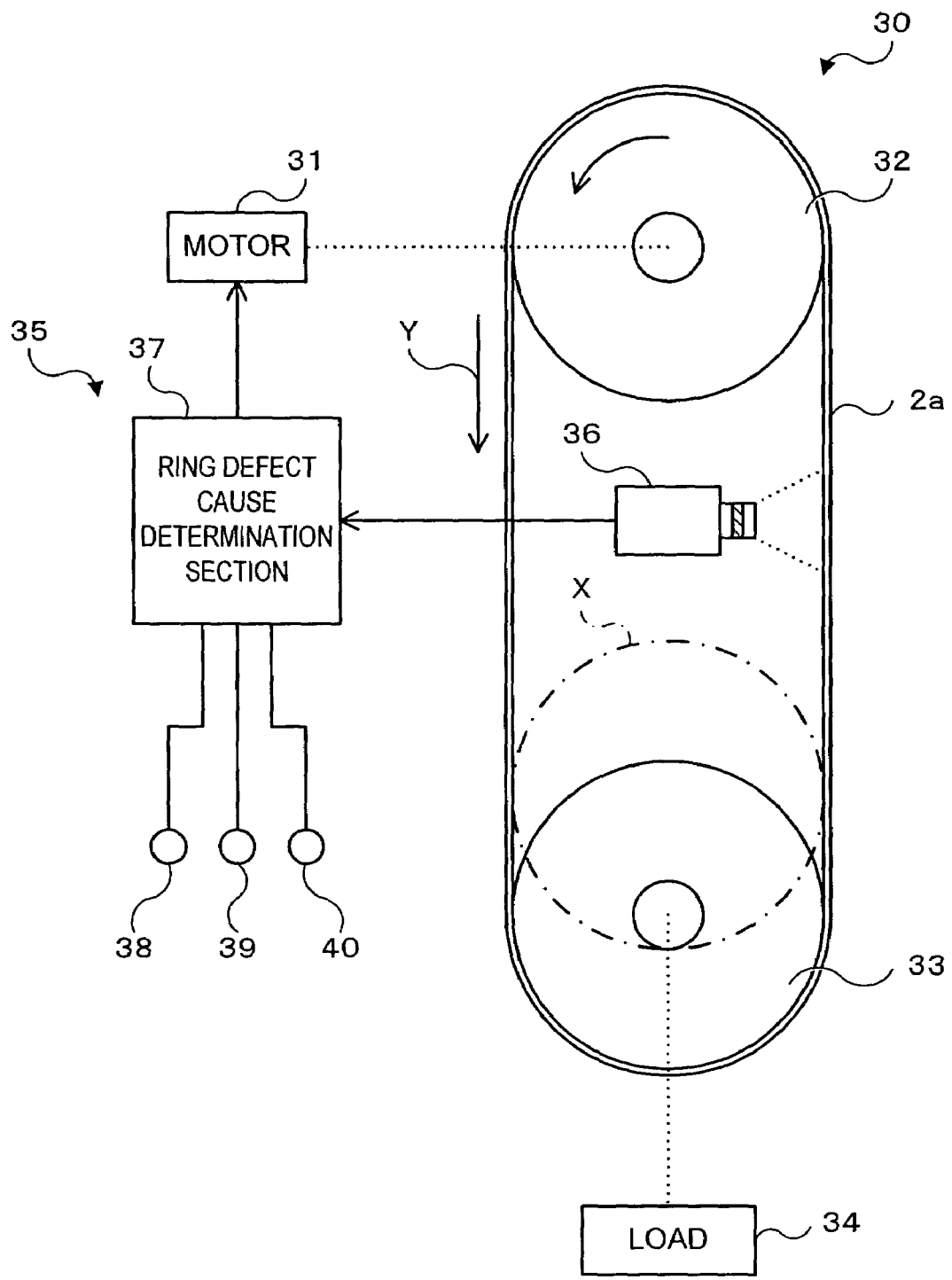
FIG. 2 is a conceptual configuration diagram of a CVT belt inspection device 30.

FIG. 2 is a conceptual configuration diagram of a CVT belt inspection device 30. The Continuously Variable Transmission (CVT) belt inspection device 30 (hereinafter, only denoted as "belt inspection device") configuration comprises a fixed position drive pulley 32 rotated by a motor 31; a variable position driven pulley 33 in which spacing arrangement is performed on the same rotation plane as the drive pulley 32; a load 34 with predetermined mass (example: 80 kg (176 lbs.)); and a ring defect inspection part 35. Besides, in addition to the drive pulley 32 and the driven pulley 33, the belt inspection device 30 may further have one or a plurality of guidance belt pulleys, but the requisite minimum of belt pulleys is two: the drive pulley 32 and the driven pulley 33.

When identifying the existence of a CVT belt "running track" and that generation cause, a CVT belt 1 which completed a test drive is disassembled and the metal belts 2a situated in the innermost circumference layer of that laminated belt 2 are placed in the inspection device 30.

Specifically, the driven pulley 33 is placed in an initial position (position of the dashed and dotted line X in FIG. 2). The metal belts 2a (metal belts 2a situated in the innermost circumference layer of a laminated belt 2) are wrapped around between the two belt pulleys (drive pulley 32 and driven pulley 33). Subsequently, the required tension is supplied to the metal belts 2a by furnishing the load 34 to the driven pulley 33 which performs downward movement of the driven pulley 33. Then, while in the same state and with the motor 31 started, the metal belts 2a perform circumferential movement in a constant direction (direction of arrow "Y" in FIG. 2). At this stage, the rear face of the metal belts 2a (the surface which is the ring (metal band) innermost circumference surface and actually comes in contact with the element saddle part 3g of a metal element 3a) is inspected with the ring defect inspection part 35.

The ring defect inspection part 35 comprises a detection section 36 (detection means) for continuously observing the rear face of the metal belts 2a and for detecting gloss marks possibly scarred to the same surface in the duration of at least one revolution of the ring circumference direction; a ring defect cause determination section 37 (determination means) for performing cause identification in cases where there is existence of a running track and with a running track; and several cause display lamps 38~40.

The detection section 36 can record the metal belts 2a rear face and the imaging unit (for example, a CCD (Charged Coupled Device) camera, etc.) outputs a binary signal 41 composed of low luminance segments (non-defective portions) and high luminance segments (gloss mark portions) within that recorded image.

Figure 3A:
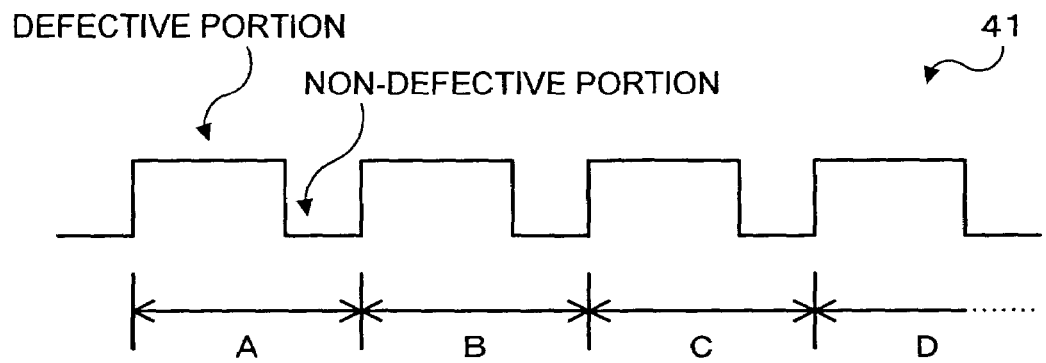
FIGS. 3A~3B are mimetic diagrams showing a binary signal 41 and a running track, respectively.

FIG. 3A is a diagram showing the binary signal 41. The binary signal 41 low logic level segments indicate non-glossy segments within the metal belts 2a rear face, namely, non-defective portions without flaws. The high logic level segments indicate glossy segments within the same rear face, namely, gloss mark portions (defective portions).

Figure 3B:
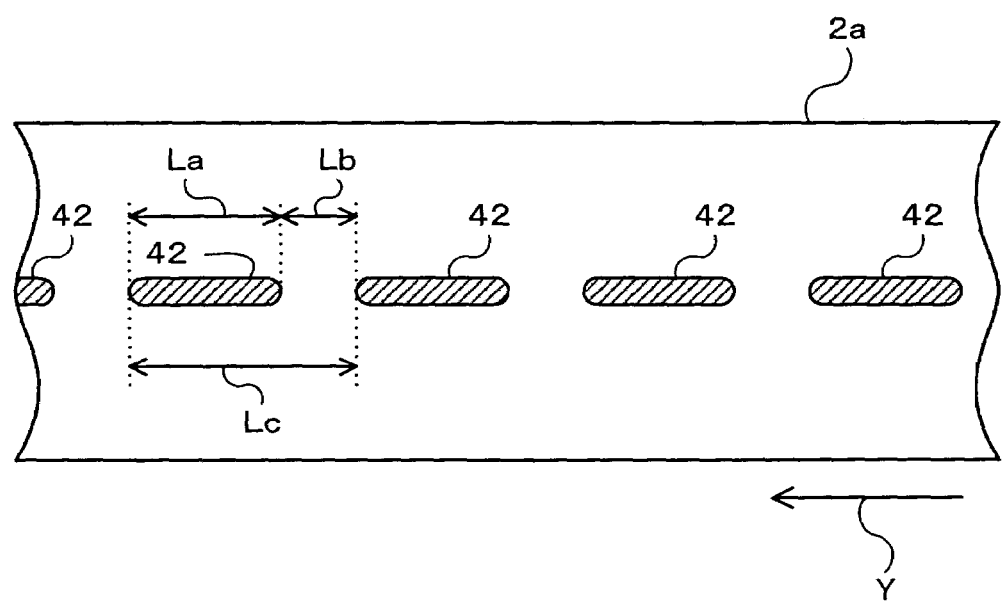

FIG. 3B is a mimetic diagram showing a running track. The rear face of the metal belts 2a as seen in FIG. 3B, the gloss marks 42 (intermittent flaws) are scarred intermittently in the circumferential direction. When La denoting length of a gloss mark 42 in the circumferential direction is performed to Lb denoting interval (spacing) of a gloss mark 42 in the circumferential direction, the pitch of that gloss mark 42 constitutes Lc (Lc=La+Lb). These measurements of La, Lb and Lc are determined in proportion to the "difference" between the circumferential traveling speed of the layered elements 3 and the circumferential traveling speed of the two laminated belts 2.

The binary signal 41 length of a high logic level segment is equivalent to La and the interval of a low logic level segment is equivalent to Lb. Further, one cycle length of a high logic level segment and a low logic level segment is equivalent to Lc.

At this stage, each cycle length of the binary signal 41 inputted into the ring defect cause determination section 37 is designated as "A", "B", "C", "D", . . . for convenience. Then, such cycle lengths are sequentially saved to a predetermined table in the ring defect cause determination section 37. In addition, the "A", "B", "C", "D" seen in FIG. 3A are simply only substitutes and do not illustrate actual values. Therefore, please do not interpret these substitutes as actual cycle length magnitude correlations (long and short sized relationships).

Figure 4A:
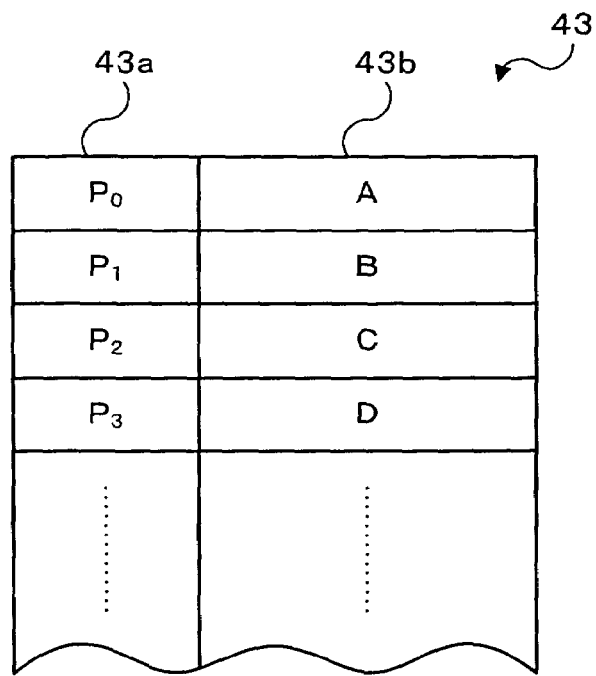
FIGS. 4A~4B are conceptual diagrams showing a predetermined table and a rate of occurrence graph of a running track pitch (Lc), respectively.

FIG. 4A is a conceptual diagram showing a predetermined table. The table 43 contains a cycle number field 43a for storing the cycle numbers $P_0, P_1, P_2, P_3, \ldots$ and a cycle length field 43b for storing each cycle length ("A", "B", "C", "D", . . . ).

Essentially, the ring defect cause determination section 37 stores an entire cycle length equivalent to at least one revolution of a metal belt 2a in the table 43. In cases where the cycle length distribution stored in the table 43 is examined and falls within a predetermined distribution tendency, the object is judged as the generation cause of a "running track" and attributed to an irregular-shaped area formed on the element saddle part 3g on one of the metal elements 3a. This results in one of the predetermined lamps lighting up (for convenience, the ring defect detection lamp 38 for an element saddle part irregular-shaped area).

Otherwise, in cases where examination does not fall within a predetermined distribution tendency, the detected object is judged as the generation cause of that "running track" and attributed to an innocuous impurity substance, for example, metal powder, etc., which penetrated into the CVT belt 1. This results in one of the predetermined lamps lighting up (for convenience, the ring defect detection lamp 39 due to an impurity on the CVT belt 1).

Otherwise, in cases where less than a predetermined number for a cycle length field stored in the table 43, this indicates the extent of a non-consecutive gloss mark in one or several places on the rear face of the metal belts 2a and accordingly judged as having flaws other than a "running track." This results in one of the predetermined lamps lighting up (for convenience, the ring defect detection lamp 40 for "other" causes).

Figure 4B:
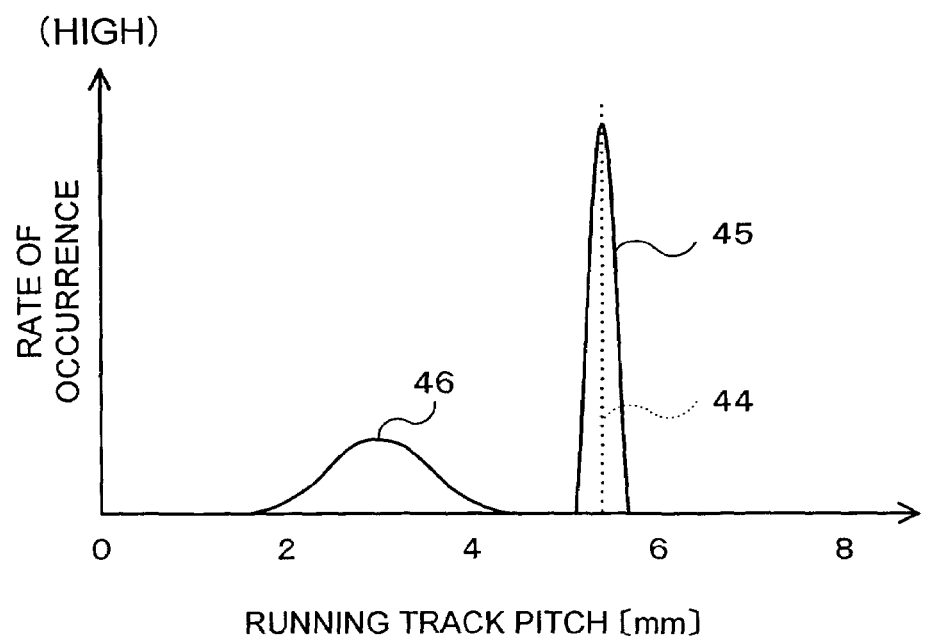

FIG. 4B is a conceptual diagram showing a rate of occurrence graph of a running track pitch (Lc). In this diagram, the vertical axis denotes the "rate of occurrence" and the horizontal axis denotes the "running track pitch." Within the graph, a dotted line 44 (reference period) denotes the theoretical value of the running track pitch based on the relative speed difference of the metal elements 3a and the metal belts 2a. For example, this theoretical value is placed between 5 mm to 6 mm (0.19 in. to 0.23 in.). Meanwhile, the solid lines illustrate two characteristic lines 45, 46 of test results performed by the inventors. The right side characteristic line 45 which is distributed narrowly (accordingly, constant periodicity was observed) using the substantially theoretical value as the center represents an object of an irregular-shaped area formed on the element saddle part 3g on one of the metal elements 3a. The left side characteristic line 46 which is distributed widely (accordingly, constant periodicity was not observed) and discriminated distinctly below the theoretical value represents a substance of an innocuous impurity, for example, metal powder, etc., which penetrated into the CVT belt 1.

In this manner, even though termed simply as a "running track,"there are definite differences in the pitch periodicity proportionate to each of these two causes (an object attributable to an irregular-shaped area and a substance attributable to an impurity, for example metal powder, etc.). Thus, the generation causes (an object attributable to an irregular-shaped area and a substance attributable to an impurity, for example metal powder, etc.) of a running track can be accurately identified using these differences. In addition, constant periodicity observed in a running track is an indication of an irregular-shaped area as the cause because the position of an irregular-shaped area is unchangeable. On the other hand, constant periodicity not observed in a running track is an indication of an impurity as the cause because the position of a substance impurity dissimilarly changes.

FIG. 5 is a diagram showing an operation flow chart of the ring defect cause determination section 37 which adapts the above principle. As seen in this flow chart, first, an initial value (0) is set to a loop variable i (Step S10), and ring circumferential drive (drive of the motor 31) is started (Step S11).

Secondly, the operation judges whether or not any high logic level segments, namely, gloss marks, are contained in the binary signal 41 from the detection section 36 (Step S12). Next, when there are no gloss marks, the operation judges whether or not a predetermined time interval has elapsed (Step S13). If the predetermined time interval has not elapsed, the operation again judges whether or not there are any gloss marks (Step S12). When a predetermined time interval elapses, ring circumferential drive is stopped (Step S16). Here, the predetermined time interval for the metal belts 2a requires at least one revolution.

When the operation judges there are existent gloss marks before a predetermined time interval elapses, the pitch of those gloss marks is measured. For example, when the running track as seen in FIG. 3B is scarred in the metal belts 2a, one cycle ("A") length of the first high logic level segment and the low logic level segment is measured (Step S14). That measurement value Pi (from $P_0$ as presently i=0) record of the cycle length field 43b is stored in the table 43 (Step S15).

Subsequently, the operation judges whether or not a predetermined time interval has elapsed (Step S16). If a predetermined time interval has not elapsed, after performing loop variable i=i+1 (Step S17), the operation again judges whether or not there are any gloss marks (Step S12). When a predetermined time intervals elapses, ring circumferential drive is stopped (Step S16). Here, the predetermined time interval for the metal belts 2a requires at least one revolution similar to Step S13.

At this stage, when a running track is scarred to the metal belts 2a as seen in FIG. 3B, repeat execution of a loop for Step S12, Step S14, Step S15 and Step S17 is performed until the operation judges a predetermined time interval has elapsed. Accordingly, each cycle length ("A", "B", "C", "D", . . . ) of the binary signal 41 is stored in the cycle length field 43b for each cycle number field 43a record $P_0$, $P_1$, $P_2$, $P_3$, . . . of the table 43.

Then, ring circumferential drive is stopped (Step S18). Next, the operation judges whether or not the loop variable i remains as the initial value (0) (Step S19). When the loop variable i remains as the initial value (0), the above-mentioned loop is also not executed once. Namely, this signifies that during one rotation of the metal belts 2a, gloss marks are also not detected one time. Accordingly, in this case, because the metal belts 2a are non-defective, the program is terminated in that condition.

Meanwhile, when the loop variable i is not the initial value (0), subsequently the operation judges whether or not the loop variable i is less than a predetermined value (Step S20). Here, a predetermined value is a reference value for judging the extent of a gloss mark in one or several places other than a running track. When the loop variable i is less than a predetermined value, the cause of any gloss marks is neither an object attributable to an irregular-shaped area on an element saddle part 3g nor an impurity which penetrated into the CVT belt 1. As this indicates an "other" cause, a lamp for specifying that result lights up (for example, the ring defect detection lamp 40 due to "other" causes) (Step S25) and the program is terminated.

When the loop variable i is not less than a predetermined value ("NO" of Step S20), the cause of those gloss marks is either attributable to an irregular-shaped area on the element saddle part 3g or an impurity which penetrated into the CVT belt 1. The distinction between these causes is performed based on the distribution of each cycle length ("A", "B", "C", "D", . . . ) stored in the table 43 (Step S21, Step S22).

Accordingly, the operation judges whether or not each cycle length ("A", "B", "C", "D", . . . ) corresponds and is distributed on the characteristic line 45 of a narrow range centering on the theoretical value (dotted line 44) in FIG. 4B.

When corresponding to the theoretical value (dotted line 44), for example, if "A"="B"="C"="D" . . . =5.5 mm (0.21 in.), the operation judges the cause of those gloss marks as an object attributable to an irregular-shaped area on an element saddle part 3g. A lamp for specifying that result lights up (for example, the ring defect detection lamp 38 due to an element saddle part irregular-shaped area) (Step S23) and the program is terminated.

When not corresponding to the theoretical value (dotted line 44), for example, if "A"="B"="C"="D" . . . =2~4 mm (0.07~0.15 in.), the operation judges the cause of those gloss marks as a substance attributable to an impurity, such as metal powder, etc., which penetrated into the CVT belt 1. A lamp for specifying that result lights up (for example, the ring defect detection lamp 39 due to an impurity on the CVT belt 1) (Step S24) and the program is terminated.

According to this embodiment as described above, the present invention is able to at least precisely distinguish whether the cause of a running track is an object attributable to an irregular-shaped area on an element saddle part 3g or a substance of an impurity, such as metal powder, etc., which penetrated into the CVT belt 1. In this manner, an inspector can be notified.

Therefore, when an inspector is particularly notified of the latter cause (an impurity, for example, metal powder, etc.), the person can avoid performing a total exchange of the metal elements 3a and replacement of the metal belts 2a. Based on these unnecessary part replacements, a significant cost reduction can be achieved.

Additionally, in the above embodiment, although an imaging unit, for example, a CCD, etc., is utilized for the detection section 36, the present invention is not restricted to this. Briefly, this function can be performed as follows. For example, the imaging unit needs only to be capable of outputting the binary signal 41 for indicating the non-glossy segments (non-defective portions without flaws) and the glossy segments (gloss mark portions with flaws) within the rear face of the metal belts 2a.

FIG. 6 is another configuration diagram of the detection section 36. This detection section 36 comprises the light guiding paths 51a~51c for illumination using a plurality of optical fibers which guide irradiated light from an inspection light source 50 to the inner circumference surface of the metal belts 2a traveling in a constant direction Y; the light guiding paths 54a, 54b for light reception using at least two optical fibers which guide reflected light 52a, 52b from the inner surface of the metal belts 2a to the light reception portions 53a, 53b and are alternately arranged between the light guiding paths 51a~51c; and a binary signal generation circuit 55.

In the non-defective portions (non-glossy segments) of the inner circumference surface of the metal belts 2a, the reflected light 52a, 52b guided by the two light guiding paths 54a, 54b for light reception is supplied to the light reception portions 53a, 53b at substantially equivalent intensity. Meanwhile, in the defective portions (glossy segments) of the inner circumference surface of the metal belts 2a, the reflected light of a glossy segment increases. When the magnitude of a gloss mark exceeds the interval L of the two light guiding paths 54a, 54b for light reception, a difference is generated in the reflected light 52a, 52b guided by the two light guiding paths 54a, 54b for light reception. For this reason, in the binary signal generation circuit 55, the binary signal 41 generated constitutes a high logic level if there is a difference in the output signal of the light reception portions 53a, 53b and a low logic level if there is no difference. Thus, a function equivalent to the detection section 36 in the above-mentioned embodiment is achievable.

Besides, although the above description illustrates an example which "automates" the cause discrimination of a running track for the metal belts 2a, this best mode embodiment is industrially beneficial and other applications are not excluded. Fundamentally, the inspection method only has to use the graph (refer to FIG. 4B) where the rate of occurrence of the above-mentioned running pitch (Lc) is shown. For example, the pitch of the intermittent gloss marks scarred in the inner circumference surface of the metal belts 2a may be measured "manually." This measuring result can be adapted to the above-mentioned graph and the cause of a running track "artificially" judged.

While the present invention has been described with reference to the preferred embodiments, it is intended that the invention be not limited by any of the details of the description therein but includes all embodiments which fall within the scope of the appended claims.

What is claimed is:

1. A Continuously Variable Transmission (CVT) belt inspection method comprising the steps of:
    trial use of a CVT belt which incorporates a testing device of an actual vehicle or actual vehicle equivalent;
    disassembly of said trial use CVT belt and detachment of a metal belt situated in an innermost circumference layer of said CVT belt;
    detection of an intermittent flaw along a circumferential direction of said metal belt inner circumference surface; and
    determining whether or not a repeating period of a flaw corresponds to a predetermined reference period when said intermittent flaw is detected, wherein a case of correspondence to said predetermined reference period determines the cause of a flaw as being an object attributable to an irregular-shaped area formed on a metal element saddle part which constitutes said CVT belt, and wherein a ease of non-correspondence to said predetermined reference period determines the cause of a flaw as being a substance attributable to an innocuous impurity which penetrated into said CVT belt.

2. The CVT belt inspection method according to claim 1, wherein said predetermined reference period is established based on a transmission gear ratio in a testing device of an actual vehicle or actual vehicle equivalent when incorporating said CVT belt for trial use.

3. A Continuously Variable Transmission (CVT) belt inspection device comprising:
    a detection means for detecting an intermittent flaw along a circumferential direction of a metal belt inner circumference surface situated in an innermost circumference layer of a CVT belt, which incorporates trial use in a testing device of an actual vehicle or an actual vehicle equivalent;
    a determination means for determining whether or not a repeating period of a flaw corresponds to a predetermined reference period when said intermittent flaw is detected by said detection means, wherein a case of correspondence to said predetermined reference period determines the cause of a flaw as being an object attributable to an irregular- shaped area formed on a metal clement saddle part which constitutes said CVT belt, and wherein a case of non-correspondence to said predetermined reference period determines the cause of a flaw as being a substance attributable to an innocuous impurity which penetrated into said CVT belt; and
    a display means for displaying a determination result of said determination means.

4. The CVT belt inspection device according to claim 3, wherein said predetermined reference period is established based on a transmission gear ratio in a testing device of an actual vehicle or actual vehicle equivalent when incorporating said CVT belt for trial use.

5. A Continuously Variable Transmission (CVT) belt inspection methods comprising the steps of:
    testing a CVT belt by installing said belt into an actual vehicle or a test device equivalent to an actual vehicle;
    disassembling said tested CVT belt and removing a metal belt layer of said CVT belt situated in the innermost circumference;
    detecting whether or not any flaws exist along a circumferential direction of said metal belt layer inner circumference surface;
    determining whether or not a running track pitch of said flaws corresponds to a predetermined reference value upon detecting said flaws; and
    judging the cause of a flaw when corresponding to said predetermined reference value to be an irregular-shaped area formed on a metal element saddle part of a metal element which constitutes said CVT belt or judging the cause of a flaw when not corresponding to said predetermined reference value to be an innocuous impurity which penetrated into said CVT belt.

6. The CVT belt inspection method according to claim 5, wherein said predetermined reference value is established based on a transmission gear ratio in an actual vehicle or a test device equivalent to an actual vehicle when installing said CVT belt for testing.

7. A Continuously Variable Transmission (CVT) belt inspection device comprising:
    a detection means for detecting whether or not any flaws exist along a circumferential direction of a metal belt layer inner circumference surface of a CVT belt situated in the innermost circumference, wherein the CVT belt is tested by installing said CVT belt into an actual vehicle or a test device equivalent to an actual vehicle;
    a determination means for determining whether or not a running track pitch of said flaws correspond to a predetermined reference value upon detecting said flaws; and
    a judgment means for judging the cause of a flaw when corresponding to said predetermined reference value to be an irregular-shaped area formed on a metal element saddle part of a metal element which constitutes said CVT belt or judging the cause of a flaw when not corresponding to said predetermined reference value to be an innocuous impurity which penetrated into said CVT belt; and
    a display means for displaying a judgment result generated by said judgment means.

8. The CVT belt inspection device according to claim 7, wherein said predetermined reference value is established based on a transmission gear ratio in an actual vehicle or a test device equivalent to an actual vehicle when installing said CVT belt for testing.

* * * * *